Jan. 8, 1929.
T. KIRBY
1,698,266
COMPACT CONTAINER
Filed July 3, 1926
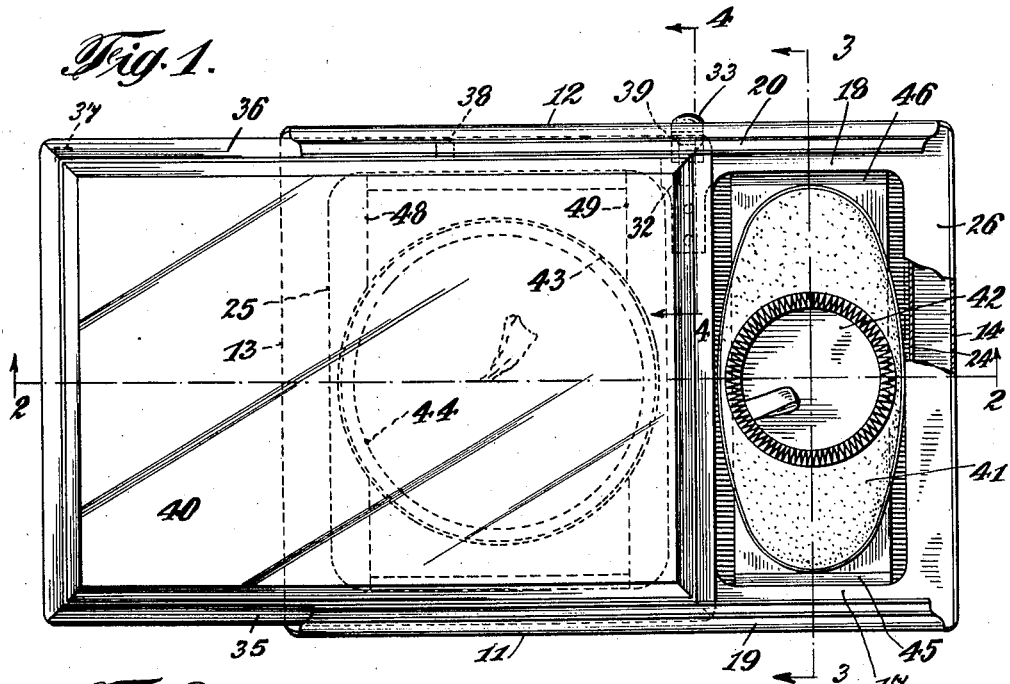
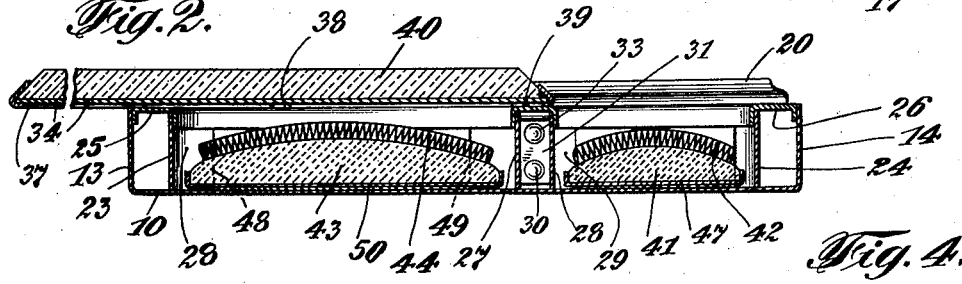
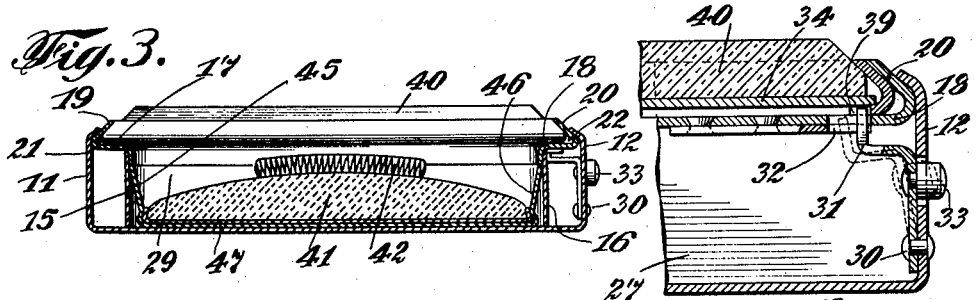
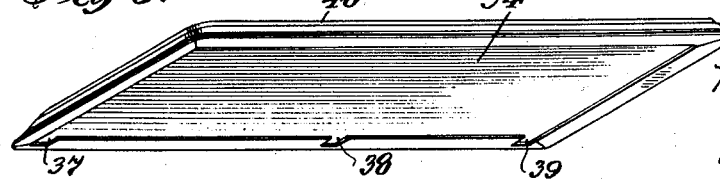
INVENTOR
Theodore Kirby
BY
his ATTORNEY Patented Jan. 8, 1929.

1,698,266

UNITED STATES PATENT OFFICE.

THEODORE KIRBY, OF NEW YORK, N. Y.

COMPACT CONTAINER.

Application filed July 3, 1926. Serial No. 120,404.

My invention relates to containers and refers particularly to containers suitable for powder compacts.

Among the objects of my invention is a powder compact container capable of carrying a plurality of compacts, the container having a slidable cover of such construction that it may be moved to expose any particular compact and which will be maintained in removable locked position during the exposure of either compact and when all of the compacts are in unexposed position.

A further object of my invention is a container carrying a mirror so positioned as to be in exposed position when either of the compacts is exposed, and which will be in convenient position during such compact exposure.

The above and other valuable and advantageous properties of the device of my invention will be evident upon a consideration of my specification and the accompanying drawings.

In the accompanying drawing illustrating one form of the device of my invention, similar parts are designated by similar numerals.

Figure 1 is a top view of one form of the device of my invention.

Figure 2 is a cross-section through the line 2—2 of Figure 1.

Figure 3 is a cross-section through the line 3—3 of Figure 1.

Figure 4 is a cross-section through the line 4—4 of Figure 1.

Figure 5 is a perspective view of the slidable cover partly broken away for clearness of description.

The particular form of the container of my invention shown in the accompanying drawings comprises a compact receptacle having the bottom 10 and the upwardly extended sides 11 and 12 and ends 13 and 14.

Extending longitudinally of the receptacle and spaced from the sides thereof are two partitions 15 and 16 to which are attached the two members 17 and 18, the upper portions 19 and 20 of which are bent upwardly to form two grooves, or angular spaces, 21, 22. The members 19 and 20 are fixedly attached to the sides 11 and 12 respectively.

Extending along the ends 13 and 14 and spaced therefrom are two partitions 23, 24, attached to which are the angular plates 25, 26, which in turn are attached to the ends 13 and 14.

Spaced from the two partitions 23 and 24 and fixedly attached to the bottom 10 is a mid-partition 27 dividing the receptacle into two compartments 28 and 29.

Fixedly attached to the side 12 at 30 is a flat spring catch 31, the upper, or free, end of which passes through an opening 32 in the plate 18. A slidable member, or button, 33 passes through the side 12, the inward movement of which presses the spring catch 31 inwardly.

A slidable cover 34 has inturned edges 35, 36 to slide within the grooves 21 and 22. One side of the cover has notches, or openings, 37, 38 and 39, into which the spring catch 31 can enter and from which it can be removed by pressure upon the button 33 for purposes described later. A mirror 40 is carried by the cover.

The operation of the device is as follows:

When the device is closed, that is when the cover 34 covers both compartments, the spring 31 is within the notch 38, thus locking the device in closed position. When it is desirous of obtaining access to the powder compact 41 and powder puff 42 in compartment 29, the button 33 is pushed inwardly thus removing the catch 31 from the notch 38 and allowing a slidable movement to the cover, as soon as a movement is given the cover, pressure is released from the button 33 and the cover movement continued until the catch 31 enters the notch 39, thus preventing further movement, the arrangement of parts is such that this interrupted movement exposes compartment 29 while compartment 28 is still covered.

When it is desired to obtain access to the powder compact 43 and the powder puff 44 in compartment 28, the movement of the cover 34 is reversed, the entrance of the catch 31 in notch 37 preventing further movement.

The members 45 and 46 serve to retain the powder compact 41 carried by the base 47 and the members 48 and 49 serve to retain the powder compact 43 carried by the base 50.

It is to be noted that when either compartment is exposed, the device may be held in one hand, thus exposing the contents of that compartment and the mirror, an arrangement of great convenience.

The cover may be entirely removed from the receptacle, if desired, by pressing the button 31 and continuing the movement of the cover beyond either notch 37 or 39.

I do not limit myself to the particular size, shape, number or arrangement of parts as shown and described, as these are given simply as a means for clearly describing my invention.

What I claim is:—

1. In a powder compact container, capable of containing a plurality of compacts, in combination, a receptacle having a bottom, two ends and two sides, the upper portion of each side extending above said ends and being bent inwardly; a longitudinally positioned partition spaced from each side and attached thereto, the upper portion of each said partition being bent upwardly to form a groove; a laterally positioned partition spaced from each end and attached thereto, the upper portion of each said partition being bent inwardly at right angles, a lateral partition within said receptacle forming two compartments, a slidable cover for said receptacle slidable within said longitudinal grooves and means for releasably locking the cover from movement when it is positioned to expose either one of the compartments while the other compartment is covered.

2. In a powder compact container, capable of containing a plurality of compacts, in combination, a receptacle having a bottom, two ends and two sides, the upper portion of each side extending above said ends and being bent inwardly; a longitudinally positioned partition spaced from each side and attached thereto, the upper portion of each said partition being bent upwardly to form a groove; a laterally positioned partition spaced from each end and attached thereto, the upper portion of each side partition being bent inwardly at right angles, a lateral partition within said receptacle forming two compartments, a slidable cover for said receptacle slidable within said longitudinal grooves, a plurality of notches within the cover, spring catch means carried by the receptacle so positioned that its insertion within the cover notches will releasably lock the cover to conceal either compartment and expose the other compartment and means exterior of the device for releasing the catch from locking engagement.

Signed at New York city in the county of New York and State of New York this 28 day of June, 1926.

THEODORE KIRBY.